(12) United States Patent
Ptasinski et al.

(10) Patent No.: US 9,709,737 B2
(45) Date of Patent: Jul. 18, 2017

(54) EMBEDDED RING RESONATOR-BASED PHOTONIC DEVICES

(71) Applicant: The United States of America as represented by the Secretary of the Navy, Washington, DC (US)

(72) Inventors: Joanna N. Ptasinski, San Diego, CA (US); Stephen D. Russell, San Diego, CA (US)

(73) Assignee: The United States of America as represented by Secretary of the Navy, Washington, DC (US)

( * ) Notice: Subject to any disclaimer, the term of this patent is extended or adjusted under 35 U.S.C. 154(b) by 144 days.

(21) Appl. No.: 14/552,783

(22) Filed: Nov. 25, 2014

(65) Prior Publication Data
US 2016/0147014 A1    May 26, 2016

(51) Int. Cl.
*G02B 6/125* (2006.01)
*G02B 6/293* (2006.01)

(52) U.S. Cl.
CPC ......... *G02B 6/125* (2013.01); *G02B 6/29338* (2013.01)

(58) Field of Classification Search
CPC .................................................... G02B 6/125
USPC ........ 385/12, 14, 147, 2; 372/20, 50, 51, 96, 372/120
See application file for complete search history.

(56) References Cited

U.S. PATENT DOCUMENTS

| | | | | |
|---|---|---|---|---|
| 7,062,118 B2* | 6/2006 | Chiu | .................. | G02B 6/29341 385/15 |
| 7,400,798 B2* | 7/2008 | de Almeida | ....... | G02B 6/12007 385/131 |
| 7,502,393 B2* | 3/2009 | Hori | ...................... | G02F 1/3534 372/21 |
| 7,750,758 B2 | 7/2010 | Zhiyu et al. | | |
| 8,655,114 B2* | 2/2014 | Popovic | ............. | G02B 6/12007 385/1 |
| 9,366,822 B1* | 6/2016 | Lentine | .............. | G02B 6/29395 |
| 9,500,930 B1* | 11/2016 | Soh | ........................ | G02F 1/3536 |

(Continued)

OTHER PUBLICATIONS

Zhang, L., et al., "Novel Filtering Function Using an Embedded Ring Resonator," Optical Society of America, Conference on Lasers and Electro-Optics, May 2008.

(Continued)

*Primary Examiner* — Akm Enayet Ullah
(74) *Attorney, Agent, or Firm* — Kyle Eppele; Ryan Friedl; Elliott Deaderick

(57) ABSTRACT

Photonic devices may include a first ring resonator and a second ring resonator located within the first ring resonator, the second ring resonator separated from and optically coupled to the first ring resonator. A waveguide structure is optically coupled to the first ring resonator and may be parallel bus waveguides optically coupled on opposite ends of the first ring resonator or a u-shaped waveguide wrapped substantially around the first ring resonator. A third ring resonator may located within the second ring resonator and may be separated from and optically coupled to the first ring resonator and the second ring resonator. A sensing medium may be disposed within the interior of the third ring resonator and optically coupled to the third ring resonator. The sensing medium is configured to undergo a change in refractive index responsive to one or more analytes bound to the sensing medium.

18 Claims, 6 Drawing Sheets

Triple Ring

(56) References Cited

U.S. PATENT DOCUMENTS

| | | | |
|---|---|---|---|
| 9,563,016 B1* | 2/2017 | Xu | G02B 6/125 |
| 9,599,613 B2* | 3/2017 | Ratner | G01N 33/54373 |
| 9,647,408 B2* | 5/2017 | Lowell | H01S 3/0078 |
| 2005/0035278 A1* | 2/2005 | Margalit | G01N 21/7746 |
| | | | 250/227.14 |
| 2005/0053111 A1* | 3/2005 | Nicolaescu | G02B 6/12004 |
| | | | 372/94 |
| 2009/0154505 A1* | 6/2009 | Oh | G02B 6/12007 |
| | | | 372/20 |
| 2012/0189025 A1* | 7/2012 | Zheng | H01S 5/1071 |
| | | | 372/20 |
| 2013/0037692 A1* | 2/2013 | Akiyama | G02F 1/0115 |
| | | | 250/201.1 |

OTHER PUBLICATIONS

Rasras, M., et al., "Demonstration of a Tunable Microwave-Photonic Notch Filter Using Low-Loss Silicon Ring Resonators," Journal of Lightwave Technology, vol. 27, No. 12, Jun. 2009.

Perentos, A., et al., "Using a Si3N4 Ring Resonator Notch Filter for Optical Carrier Reduction and Modulation Depth Enhancement in Radio-Over-Fiber Links," IEEE Photonics Journal., vol. 5, No. 1, Feb. 2013.

* cited by examiner

Double Embedded Ring

Wrapped Double Ring

Triple Ring

Sensor

EMBEDDED RING RESONATOR-BASED PHOTONIC DEVICES

FEDERALLY SPONSORED RESEARCH AND DEVELOPMENT

The Embedded Ring Resonator-Based Photonic Devices is assigned to the United States Government. Licensing inquiries may be directed to Office of Research and Technical Applications, Space and Naval Warfare Systems Center, Pacific, Code 72120, San Diego, Calif., 92152; telephone (619) 553-5118; email: ssc_pac_t2@navy.mil. Reference Navy Case No. 102249.

BACKGROUND

Silicon photonics is the study and application of photonic systems which use silicon as an optical medium. Silicon-based optical devices exploit the benefits of silicon while also being fully compatible with electronics. Silicon photonics has emerged as a powerful platform for photonic integration as it allows optical devices to be made cheaply using standard semiconductor fabrication techniques and integrated with microelectronic chips. With advanced lithographic capability (currently at 32 nm node, with future scaling to 22, 16, and 11 nm nodes), novel sub-wavelength optical devices can be manufactured at wafer scale. High volume production at low cost is possible by leveraging on existing semiconductor foundries. Several silicon photonic chips have been commercialized. However, they are limited to rather simple functionalities such as transmitters and receivers.

Network technical requirements and operation needs continue to evolve towards a direction in which information and services can be transmitted rapidly and at low cost to anyone, anywhere, at any time. Such a ubiquitous network will enable novel practical applications in telemedicine, immersive tele-presence and tele-education, in addition to providing the public with access to high bandwidth at low cost. The existing network cannot simply scale to realize this bold vision. The gap is experienced at the end user, as there is no cost effective means of providing high bandwidth (10 Gbit/s) applications. It is now well established that transmitting information over long distances at high data rate requires the use of optical technology. To that effect novel silicon photonic integrated circuits need to be developed. These circuits need to provide a wide variety of functions including: optical switching, optical filtering, and add-drop multiplexing—all in a compact footprint.

Silicon photonic devices can be made using existing semiconductor fabrication techniques, and because silicon is already used as the substrate for most integrated circuits, it is possible to create hybrid devices in which the optical and electronic components are integrated onto a single microchip. Thus, in addition to high speed networking, integrating sensors monolithically with photonic and electronic circuitry offers unparalleled temporal response with small size, weight and low power.

DETAILED DESCRIPTION OF SOME EMBODIMENTS

Reference in the specification to "one embodiment" or to "an embodiment" means that a particular element, feature, structure, or characteristic described in connection with the embodiments is included in at least one embodiment. The appearances of the phrases "in one embodiment", "in some embodiments", and "in other embodiments" in various places in the specification are not necessarily all referring to the same embodiment or the same set of embodiments.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Additionally, use of the "a" or "an" are employed to describe elements and components of the embodiments herein. This is done merely for convenience and to give a general sense of the invention. This detailed description should be read to include one or at least one and the singular also includes the plural unless it is obviously meant otherwise.

Figure 1:
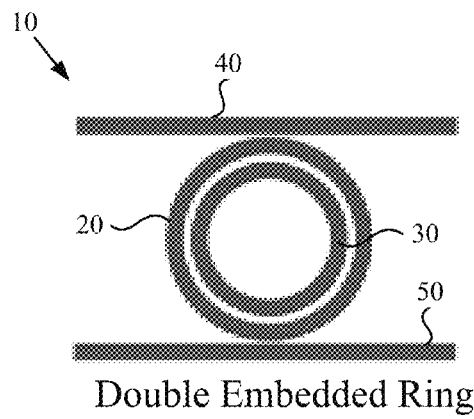
FIG. 1 shows a diagram illustrating an embodiment of double embedded ring photonic device in accordance with the Embedded Ring Resonator-Based Photonic Devices.

The embodiments disclosed herein describe embedded ring resonator-based photonic devices comprised of two or more ring resonators. Examples of devices include notch filters, sawtooth filters, and sensor devices. FIG. 1 shows a diagram illustrating an embodiment of double embedded ring photonic device 10 in accordance with the Embedded Ring Resonator-Based Photonic Devices. Device 10 includes a first ring resonator 20 having a first outer diameter and a first inner diameter, a second ring resonator 30 having a second outer diameter and a second inner diameter, and a waveguide structure optically coupled to the first ring resonator. The second outer diameter is less than the first inner diameter.

As shown, the waveguide structure is two parallel bus waveguides 40 and 50 optically coupled on opposite ends of the first ring resonator. In some embodiments however, the waveguide structure may only comprise one waveguide 40 or 50 optically coupled to first ring resonator 20. Second ring resonator 30 is separated from and optically coupled to first ring resonator 20 and located within the first inner diameter.

In some embodiments, first ring resonator 20, second ring resonator 30, and the waveguide structure comprise silicon-based material. In other embodiments, they may comprise silicon nitride material, silicon dioxide material, semiconductor material or polymer-based material. In some embodiments, first ring resonator 20 and second ring resonator 30 are concentric. In some embodiments, the waveguide structure is separated from first ring resonator 20.

Figure 2:
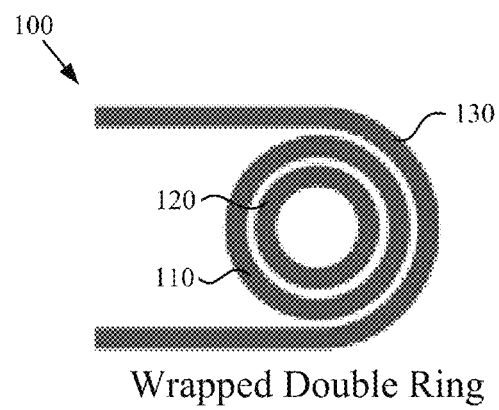
FIG. 2 shows a diagram illustrating an embodiment of wrapped double ring photonic device in accordance with the Embedded Ring Resonator-Based Photonic Devices.

FIG. 2 shows a diagram illustrating an embodiment of wrapped double ring photonic device 100 in accordance with the Embedded Ring Resonator-Based Photonic Devices. Device 100 includes a first ring resonator 110 having a first outer diameter and a first inner diameter, a second ring resonator 120 having a second outer diameter and a second inner diameter, and a waveguide structure optically coupled to the first ring resonator. The second outer diameter is less than the first inner diameter. As shown, the waveguide structure is a u-shaped waveguide 130 wrapped substantially around first ring resonator 110. Second ring resonator 120 is separated from and optically coupled to first ring resonator 110 and located within the first inner diameter.

In some embodiments, first ring resonator 110, second ring resonator 120, and waveguide structure 130 comprise silicon-based material. In other embodiments, they may comprise silicon nitride material, silicon dioxide material, semiconductor material or polymer-based material. In some embodiments, first ring resonator 110 and second ring resonator 120 are concentric. In some embodiments, waveguide structure 130 is separated from first ring resonator 110.

Figure 3:
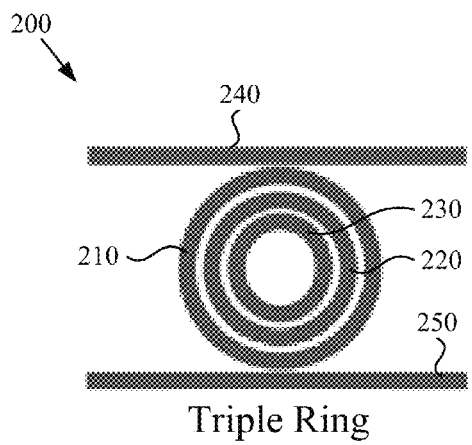
FIG. 3 shows a diagram illustrating an embodiment of triple embedded ring photonic device in accordance with the Embedded Ring Resonator-Based Photonic Devices.

FIG. 3 shows a diagram illustrating an embodiment of triple embedded ring photonic device 200 in accordance with the Embedded Ring Resonator-Based Photonic Devices. Device 200 includes a first ring resonator 210 having a first outer diameter and a first inner diameter, a second ring resonator 220 having a second outer diameter and a second inner diameter, a third ring resonator 230 having a third outer diameter and a third inner diameter, and a waveguide structure optically coupled to first ring resonator 210. The second outer diameter is less than the first inner diameter and the third outer diameter is less than the second inner diameter.

As shown, the waveguide structure is two parallel bus waveguides 240 and 250 optically coupled on opposite ends of the first ring resonator. In some embodiments however, the waveguide structure may only comprise one waveguide 240 or 250 optically coupled to first ring resonator 210. Second ring resonator 220 is separated from and optically coupled to first ring resonator 210 and located within the first inner diameter, while third ring resonator 230 is separated from and optically coupled to first ring resonator 210 and second ring resonator 220 and located within the second inner diameter.

In some embodiments, first ring resonator 210, second ring resonator 220, third ring resonator 230, and the waveguide structure comprise silicon-based material. In other embodiments, they may comprise silicon nitride material, silicon dioxide material, semiconductor material or polymer-based material. In some embodiments, first ring resonator 210, second ring resonator 220, and third ring resonator 230 are concentric. In some embodiments, the waveguide structure is separated from first ring resonator 210.

Figure 4:
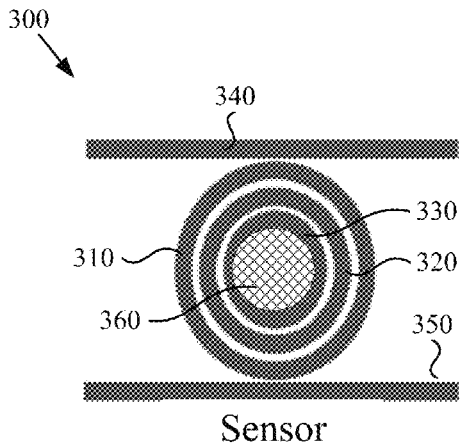
FIG. 4 shows a diagram illustrating an embodiment of triple embedded ring photonic sensor device in accordance with the Embedded Ring Resonator-Based Photonic Devices.

As an example, the devices shown in FIGS. 1-3 may be used for high speed communications applications, whereas the device 300 shown in FIG. 4 may be used for sensor applications. Since the evanescent field of the light traveling within a ring resonator can extend hundreds of nanometers into the surrounding medium, and the circulating nature of the resonator provides an extended effective interaction length, a small resonator can have the same sensitivity of a much larger sensor.

FIG. 4 shows one example of a sensor—a triple embedded ring photonic sensor device 300. In this depiction, the central resonator is exposed to the surrounding medium, which will cause a refractive index change from analytes in the medium. The corresponding change in refractive index will result in a shift in the filter wavelength. Detection of changes in filter wavelength can be done by measuring intensity changes of the designed wavelength or by differential spectral measurement with a companion resonator. This sensor has a surface interaction with the analytes in the medium, but the device may be designed so that the central portion of the resonator is etched to form a cavity within the resonator to increase the interaction volume on the ring resonator. The central portion of the resonator may alternately be textured, porous or formed to increase the interaction surface area on the ring resonator to increase detection sensitivity.

As such, device 300 includes a first ring resonator 310 having a first outer diameter and a first inner diameter, a second ring resonator 320 having a second outer diameter and a second inner diameter, a third ring resonator 330 having a third outer diameter and a third inner diameter, and a waveguide structure optically coupled to the first ring resonator. The second outer diameter is less than the first inner diameter and the third outer diameter is less than the second inner diameter.

As shown, the waveguide structure is two parallel bus waveguides 340 and 350 optically coupled on opposite ends of the first ring resonator. In some embodiments however, the waveguide structure may only comprise one waveguide 340 or 350 optically coupled to first ring resonator 310. Second ring resonator 320 is separated from and optically coupled to first ring resonator 310 and located within the first inner diameter, while third ring resonator 330 is separated from and optically coupled to first ring resonator 310 and second ring resonator 320 and located within the second inner diameter.

In some embodiments, first ring resonator 310, second ring resonator 320, third ring resonator 330, and the waveguide structure comprise silicon-based material. In other embodiments, they may comprise silicon nitride material, silicon dioxide material, or polymer-based material. In some embodiments, first ring resonator 310, second ring resonator 320, and third ring resonator are concentric. In some embodiments, the waveguide structure is separated from first ring resonator 310.

A sensing medium 360 is disposed within the interior of third ring resonator 330 and is optically coupled to third ring resonator 330. In some embodiments, sensing medium 360 is configured to undergo a change in refractive index responsive to one or more analytes bound to the sensing medium. As an example, sensing medium 360 may comprise a chromogenic ionophore; a carboxymethyl-dextran matrix; graphene; polydimethylsiloxane (PDMS); Eosin and the like. The sensing medium 360 may also, in some embodiments, may be void and the environment is optically coupled to third ring resonator 330. The detection of the analyte may include chemicals, proteins, DNA in liquid or liquid adsorbate form or any other material including a gaseous medium that alters the refractive index in the region coupled to the resonator. For specific detection of a particular analyte, sensing materials 360 may be formed on ring resonator 330 that have specific detection capabilities. Examples include: bacteriophage, DNA oligomers, peptides or related recognition molecules. In these cases, the sensing signal (i.e. spectral shift) is generated by specific binding of the analytes to the capture molecules.

It should be noted that, although FIGS. 1-4 show devices with two and three ring resonators, embodiments disclosed herein may include a multitude of embedded ring resonators. Further, the ring widths may vary as well as the spacing between them. Additionally, the plurality of resonators do not need to lie in the same plane, as they may be placed above or below another given resonator so long as the evanescent fields appropriately interact. This device may be formed by forming multiple layers in the fabrication process. Multiple resonators may also be concatenated in the same plane and spaced for coupling between the resonators.

A notch filter may be made by using a triple ring configuration, such as device 200 shown in FIG. 3, but having only one waveguide 240 or 250 optically coupled to first ring resonator 210. The notch filter offers a ten-fold narrower Full Width at Half Maximum (FWHM) as compared to a single ring resonator. As an example, waveguide 240 or 250 is 550 nm wide and the ring dimensions may be as follows: first ring resonator 210 outer radius 12 μm and inner radius 11.45 μm, second ring resonator 220 outer radius 11.35 μm and inner radius 10.79 μm, third ring resonator 230 outer radius 10.69 μm and inner radius 10.12 μm.

Figure 5:
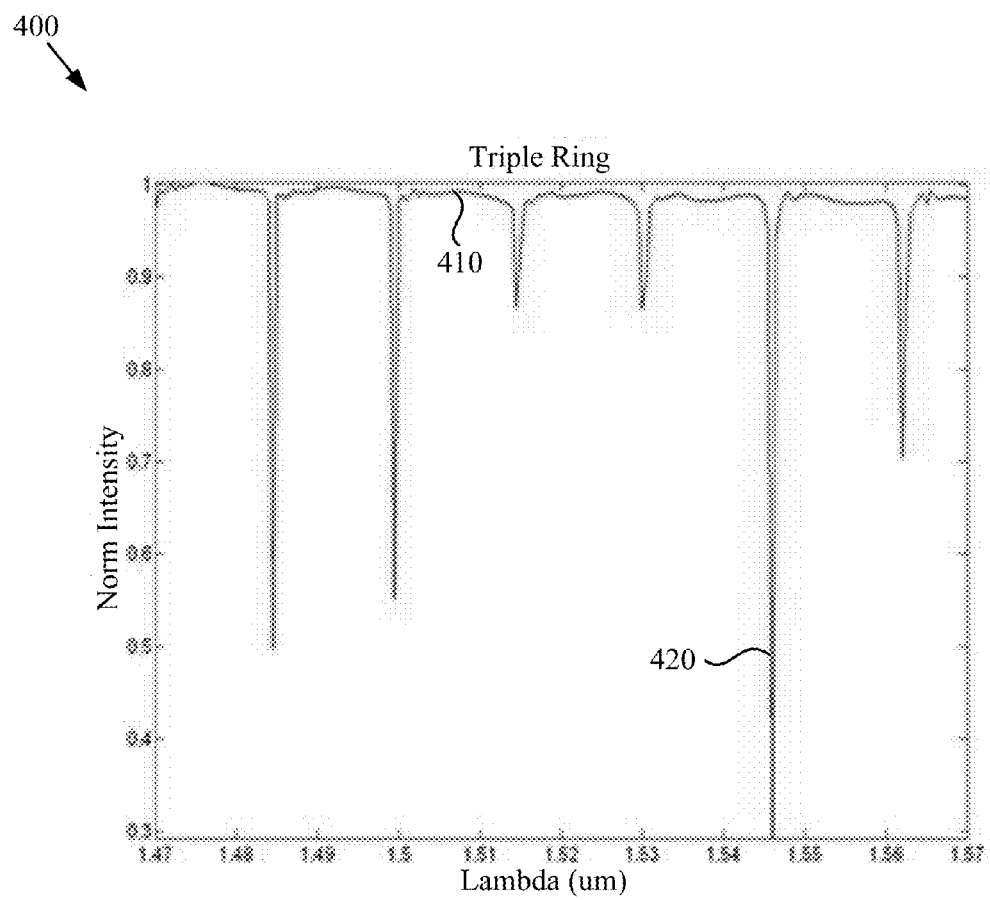
FIG. 5 shows a graph illustrating the response of a triple ring device in accordance with the Embedded Ring Resonator-Based Photonic Devices.

FIG. 5 shows a graph 400 illustrating the response 410 of a triple ring device having dimensions as discussed above. As shown, the resulting FWHM of the notch 420 at 1.546 μm is 4 Å. The triple ring resonator device also results in a larger free spectral range (FSR) as compared to just a single ring resonator device. The single ring FSR is on the order of 8 nm, while the triple ring FSR is 14 nm (nearly doubled).

Alternately, the notch filter may be made by using the wrapped double ring resonator device 100 shown in FIG. 2. As an example, the curved waveguide portion 130 may be 550 nm wide and may have an outside diameter of 21.4 μm. The width of first resonator ring 110 may be 550 nm, while the width of second resonator ring 120 may be 600 nm. The outside diameter of first ring resonator 110 may be 20.1 μm, while the outside diameter of second ring resonator 120 may be 18.8 μm.

Figure 6:
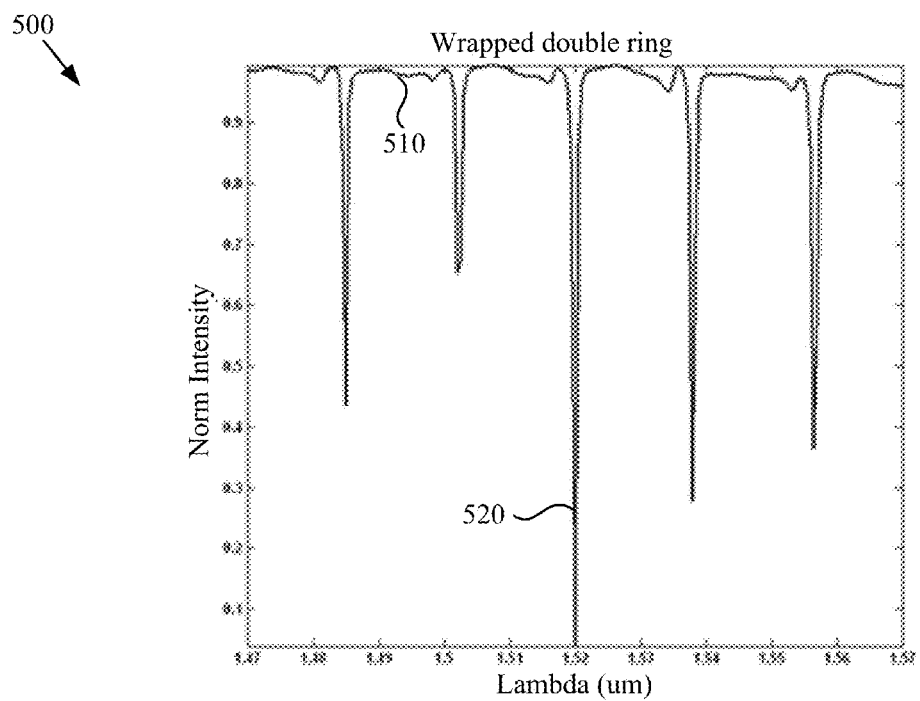
FIGS. 6 and 7 show graphs illustrating the response of a wrapped double ring device in accordance with the Embedded Ring Resonator-Based Photonic Devices.
Figure 7:
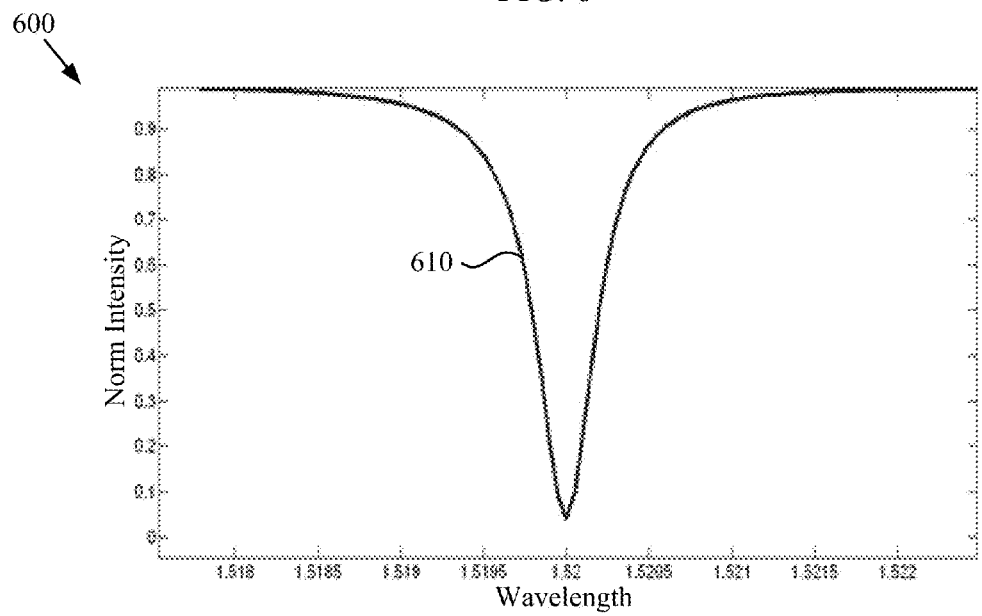

FIGS. 6 and 7 show graphs illustrating the response of a wrapped double ring device, such as device 100 shown in FIG. 2, in accordance with the Embedded Ring Resonator-Based Photonic Devices. FIG. 6 shows a graph 500 of a response 510 of a wrapped double ring resonator device having the dimensions discussed above. The resulting notch 520 is 6 Å wide at its FWHM point at 1.52 μm. FIG. 7 shows a graph 600 illustrating a close-up view of notch 520, shown as reference 610.

A sawtooth filter may be made by using the double embedded ring resonator device 10 shown in FIG. 1, where there are three output ports for a single input port. As an example, the width of both the straight waveguide portion 40 or 50 and first resonator ring 20 may be 550 nm. The width of second ring resonator 30 may be increased, as is depicted in the graphs shown in FIGS. 8-10. As an example, the spacing between first ring resonator 20 and second ring resonator 30 may be 100 nm. The extinction ratio depends on spacing between the rings. Higher spacing between rings means a lower extinction ratio and a larger FWHM. Also, reducing the ring radius increases the free spectral range. Thus, one may tailor the properties of the sawtooth filter by varying the ring spacing and ring radius.

Figure 8:
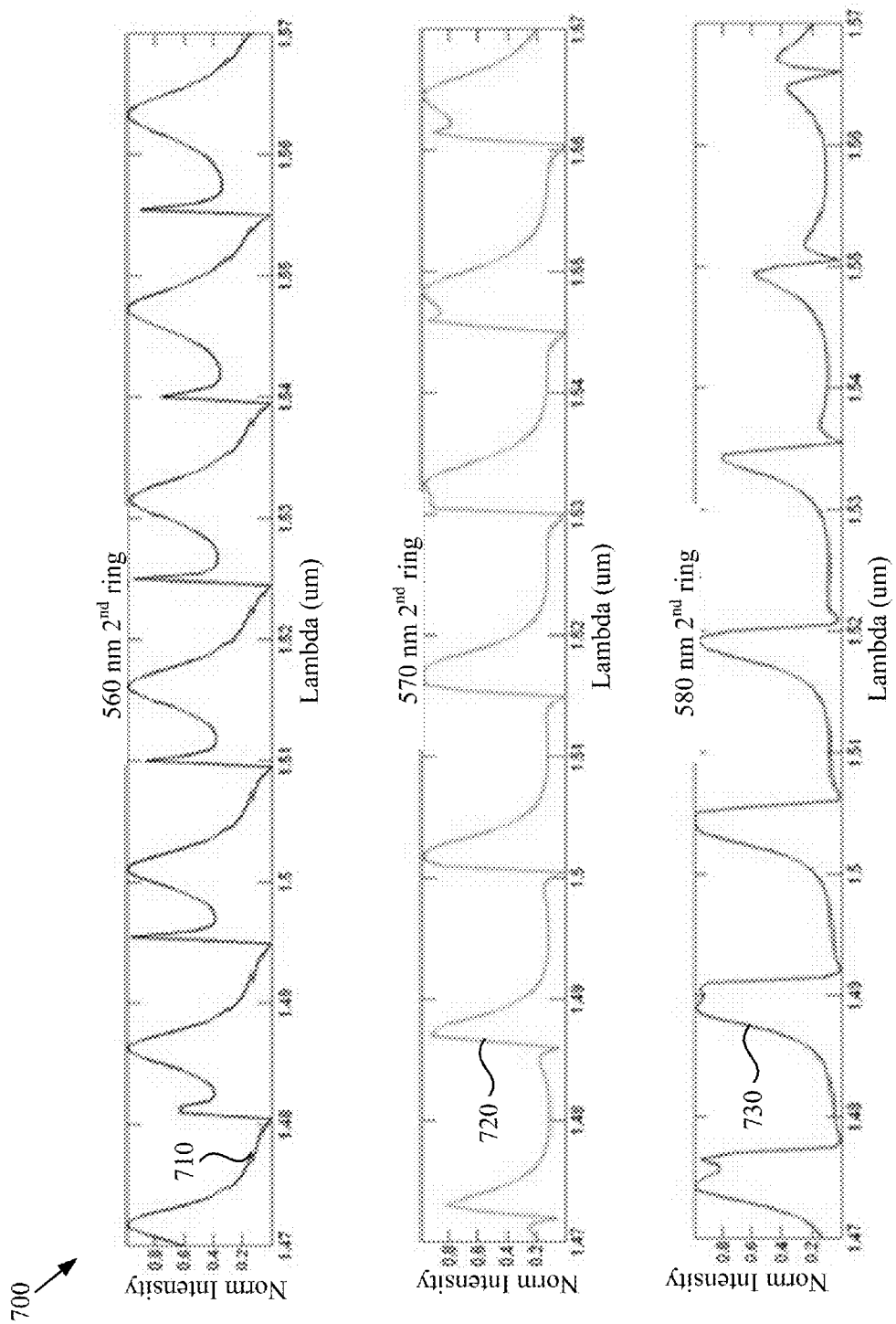
FIGS. 8-10 show graphs illustrating the responses of double embedded ring devices having different widths and different width increments in accordance with the Embedded Ring Resonator-Based Photonic Devices.

FIG. 8 shows a graph 700 of the response of a double embedded ring resonator device, such as device 10, having a first ring resonator width and waveguide structure width of 550 nm. The spacing between first ring resonator 20 and second ring resonator 30 is 100 nm. The top line 710 represents a response with second ring resonator 30 having a width of 560 nm, the middle line 720 represents a response with second ring resonator 30 having a width of 570 nm, and the bottom line 730 represents a response with second ring resonator 30 having a width of 580 nm.

Figure 9:
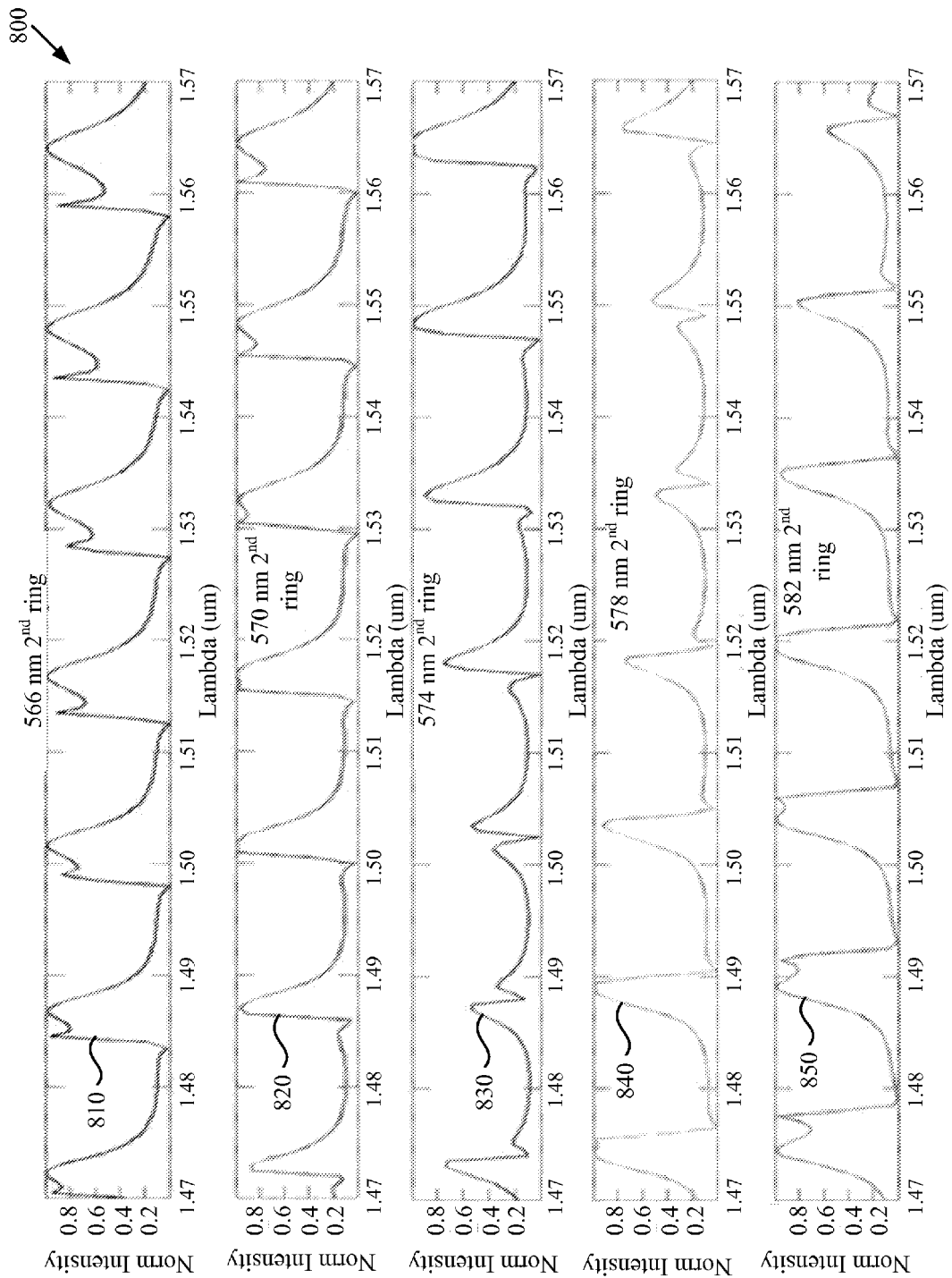

FIG. 9 shows a graph 800 of the response of a double embedded ring resonator device having a first ring resonator width and waveguide structure width of 550 nm. The spacing between first ring resonator 20 and second ring resonator 30 is 100 nm. FIG. 8 shows different dimensions for the width of second ring resonator 30, with each line representing a change of 4 nm in width. The top line 810 represents a response with second ring resonator 30 having a width of 566 nm, the second line down 820 represents a response with second ring resonator 30 having a width of 570 nm, the third line down 830 represents a response with second ring resonator 30 having a width of 574 nm, the fourth line down 840 represents a response with second ring resonator 30 having a width of 578 nm, and the bottom line 850 represents a response with second ring resonator 30 having a width of 582 nm.

Figure 10:
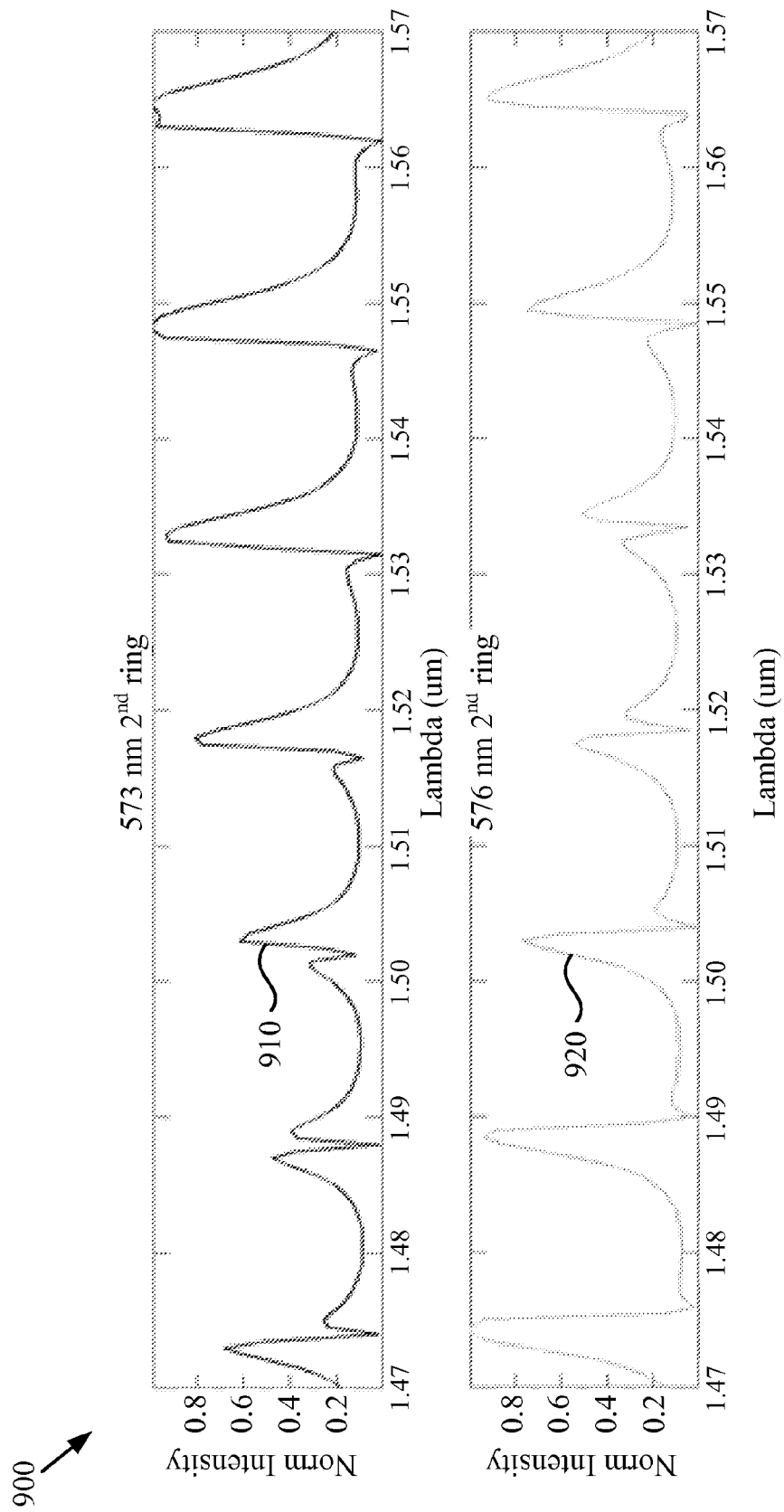

FIG. 10 shows a graph 900 of the response of a double embedded ring resonator device having a first ring resonator width and waveguide structure width of 550 nm. The spacing between first ring resonator 20 and second ring resonator 30 is 100 nm. FIG. 9 shows different dimensions for the width of second ring resonator 30, with each line representing a change of 3 nm in width. The top line 910 represents a response with second ring resonator 30 having a width of 573 nm. The bottom line 920 represents a response with second ring resonator 30 having a width of 576 nm.

As can be seen from the graphs in FIGS. 8-10, as the width of second ring resonator 30 increases, the response begins to resemble a sawtooth at longer wavelengths. As the width of second ring resonator 30 increases even further, the sawtooth response is shifted to shorter wavelengths.

A specific method for fabricating the ring resonators as discussed herein is described below. Variations in processing may be used to accommodate sensor designs or optical communication designs as required for the job at hand. The exemplary fabrication process steps include the following:

1. Obtain a silicon on insulator (SOI) wafer composed of 250 nm silicon layer formed on top of 3 μm SiO2 and with a silicon handle, for a total wafer thickness of 680 μm. The 3 μm buried oxide layer aids in preventing the evanescent field of the optical mode from penetrating the silicon substrate below.
2. Cover the wafer in an electron beam (ebeam) resist such as PMMA 950-A4 in preparation for dicing, for example:
    a. Spincoat PMMA resist at 2000 rpm for 1 minute.
    b. Softbake for 1 minute at 180° C. for 60 seconds in order to remove the solvent.
3. If desired, dice the wafer into individual chips approximately 20 mm×20 mm in size.

4. Remove the PMMA resist by Remover PG, ACRYL STRIP or acetone, then Nitrogen dry.
5. Clean each chip as follows:
   a. Acetone bath: 10 minutes.
   b. Methanol rinse, IPA rinse. Nitrogen dry.
   c. Dehydrate: 180° C. using a hotplate.
6. Coat the sample with a 180 nm thick layer of FOX-16 (Flowable oxide) resist:
   a. Warm up FOX-16 resist closer to room temperature by taking it out of the storage refrigerator and waiting 20-30 minutes before using it.
   b. Dilute FOX-16: 2 parts MIBK to 1 part FOX-16 by weight
   c. Spin FOX-16 at 4000 rpm for 50 seconds.
7. Softbake at 175° C. using a hotplate for 4 minutes.
8. Expose via electron beam lithography system, such as the JEOL JBX-5D11.
9. Develop in TMAH between 30 seconds-60 seconds (development time is dependent on the ebeam dosage used).
10. Dry etch.
    a. If using the Oxford Plasmalab 100 RIE/ICP, run the Silicon Waveguide recipe for 1 minute and 30 seconds.
11. Deposit $SiO_2$ cladding via plasma-enhanced chemical vapor deposition (PECVD). The length of deposition time is dependent on the desired thickness of $SiO_2$ (25-45 minutes).

In no further processing is desired, then dice the chip in the following manner:
12. Deposit PMMA 950-A4 in preparation for dicing.
    a. Spincoat PMMA at 2000 rpm for 1 minute.
    b. Softbake for 1 minute at 180° C. for 60 seconds in order to remove the solvent.
13. Dice at the edge of the waveguides, polish the facets. Alternately, dice up to 100 μm on each side of waveguide and cleave.

If further processing is desired such as making areas for an electro-optically tunable material, then dice into "rough" 10 mm×10 mm chips (do not dice at the edge of the waveguides). Each chip will contain a subset of structures.
14. Remove PMMA by Remover PG, ACRYL STRIP or acetone. Nitrogen dry.
15. Prepare windows within the cladding layer for an electro-optically tunable material using S1805 photoresist, as described in the steps below.
16. Rinse sample with acetone and IPA. Nitrogen dry.
17. Pattern window areas for electro-optic material (if desired). Use undiluted S1805 photoresist.
18. Rinse sample in Acetone and IPA rinse. Nitrogen dry.
19. Bake. Hotplate 5 minutes at 105V.
20. Hexamethyldisilazane (HMDS) bath to dehydrate the sample. 2 minutes.
21. Spincoat S1805 at 4000 rpm for 40 seconds for a ~500 nm thick layer.
22. Softbake at 105° C. for 2 minutes.
23. Expose with a UV source (for example HTG Mask Aligner).
24. Develop with MF-319 for 1 minute. DI water rinse. Nitrogen dry.
25. Use BOE 1:6 (6 parts 40% NH4F and 1 part. 49% HF) for ~3:30 minutes to remove a ~1800 nm layer of $SiO_2$.
26. Remove the remaining resist with standard Microposit removers.
27. If no further processing is desired, then follow the dicing steps below. If the sample is to undergo further processing to enable plasmonic structures, then skip the dicing step.
28. Deposit PMMA 950-A4 in preparation for dicing or cleaving.
    a. Spincoat PMMA at 2000 rpm for 1 minute.
    b. Softbake for 1 minute at 180° C. for 60 seconds in order to remove the solvent.
29. Dice at the edge of the waveguides, polish the facets. Alternately, dice up to 100 μm on each side of waveguide and cleave.

If structures exhibiting surface plasmon resonance are desired, several other fabrication steps are required.
30. Remove PMMA by Remover PG, ACRYL STRIP or acetone. Nitrogen dry.
31. Prepare areas of plasmonic structures with S1805 photoresist for liftoff, as described in the steps below.
32. Rinse sample with acetone and IPA. Nitrogen dry.
33. Pattern window areas for metal deposition. Use undiluted S1805 photoresist.
34. Rinse sample in Acetone and IPA rinse. Nitrogen dry.
35. Bake. Hotplate 5 minutes at 105° C.
36. Hexamethyldisilazane (HMDS) bath to dehydrate the sample. 2 minutes.
37. Spincoat S1805 at 4000 rpm for 40 seconds for a ~500 nm thick layer.
38. Softbake at 105° C. for 2 minutes.
39. Expose with a UV source (for example HTG Mask Aligner).
40. Develop with MF-319 for 1 minute. DI water rinse. Nitrogen dry.
41. Use ebeam evaporation to deposit a thin layer (2 nm-5 nm) of Cr or Ti to aid in the adhesion of gold. Deposit 100 nm of gold. Do not use sputtering for this step, as it will cover the resist sidewalls, thereby preventing liftoff.
42. Remove the remaining resist with standard Microposit removers.
43. Prepare the sample for dicing.
44. Deposit PMMA 950-A4 in preparation for dicing or cleaving.
    a. Spincoat PMMA at 2000 rpm for 1 minute.
    b. Softbake for 1 minute at 180° C. for 60 seconds in order to remove the solvent.
45. Dice at the edge of the waveguides, polish the facets. Alternately, dice up to 100 um on each side of waveguide and cleave.

For sensors, additional fabrication steps may include photolithographic patterning, etching a desired analyte interaction region, for example a reservoir operatively coupled to a resonator, and then removing the resist.

Many modifications and variations of the Embedded Ring Resonator-Based Photonic Devices are possible in light of the above description. Within the scope of the appended claims, the embodiments of the systems described herein may be practiced otherwise than as specifically described. The scope of the claims is not limited to the implementations and the embodiments disclosed herein, but extends to other implementations and embodiments as may be contemplated by those having ordinary skill in the art.

I claim:
1. A system comprising:
   a first photonic ring resonator having a first outer diameter and a first inner diameter;
   a second photonic ring resonator having a second outer diameter and a second inner diameter, the second outer diameter being less than the first inner diameter, the second photonic ring resonator separated from and optically coupled to the first photonic ring resonator and located within the first inner diameter;

a third photonic ring resonator having a third outer diameter and a third inner diameter, the third outer diameter being less than the second inner diameter, the third photonic ring resonator separated from and optically coupled to the first photonic ring resonator and the second photonic ring resonator and located within the second inner diameter; and a waveguide structure optically coupled to the first photonic ring resonator.

2. The system of claim 1, wherein the waveguide structure is two parallel bus waveguides optically coupled on opposite ends of the first photonic ring resonator.

3. The system of claim 1, wherein the waveguide structure is a u-shaped waveguide wrapped substantially around the first photonic ring resonator.

4. The system of claim 1, wherein the waveguide structure is two parallel bus waveguides optically coupled on opposite ends of the first photonic ring resonator.

5. The system of claim 1, further comprising a sensing medium disposed within the interior of the third photonic ring resonator and optically coupled to the third photonic ring resonator.

6. The system of claim 5, wherein the sensing medium is configured to undergo a change in refractive index responsive to one or more analytes bound to the sensing medium.

7. The system of claim 1, wherein the first photonic ring resonator, the second photonic ring resonator, and the waveguide structure comprise silicon-based material.

8. The system of claim 1, wherein the first photonic ring resonator and the second photonic ring resonator are concentric.

9. The system of claim 1 further comprising a sensing medium disposed within the interior of the second photonic ring resonator and optically coupled to the second photonic ring resonator.

10. The system of claim 9, wherein the sensing medium is configured to undergo a change in refractive index responsive to one or more analytes bound to the sensing medium.

11. The system of claim 1, wherein the waveguide structure is separated from the first photonic ring resonator.

12. The system of claim 1, wherein the width of the second photonic ring resonator is greater than the width of the first photonic ring resonator.

13. A system comprising:

a first photonic ring resonator having a first outer diameter and a first inner diameter;

a second photonic ring resonator having a second outer diameter and a second inner diameter, the second outer diameter being less than the first inner diameter, the second photonic ring resonator separated from and optically coupled to the first photonic ring resonator and located within the first inner diameter, wherein the first photonic ring resonator and the second photonic ring resonator are concentric, wherein the width of the second photonic ring resonator is greater than the width of the first photonic ring resonator;

a third photonic ring resonator having a third outer diameter and a third inner diameter, the third outer diameter being less than the second inner diameter, the third photonic ring resonator separated from and optically coupled to the first photonic ring resonator and the second photonic ring resonator and located within the second inner diameter; and a waveguide structure optically coupled to the first photonic ring resonator, wherein the waveguide structure is separated from the first photonic ring resonator.

14. The system of claim 13, wherein the waveguide structure is two parallel bus waveguides optically coupled on opposite ends of the first photonic ring resonator.

15. The system of claim 13, wherein the waveguide structure is a u-shaped waveguide wrapped substantially around the first photonic ring resonator.

16. The system of claim 13, further comprising a sensing medium disposed within the interior of the third photonic ring resonator and optically coupled to the third photonic ring resonator, wherein the sensing medium is configured to undergo a change in refractive index responsive to analytes bound to the sensing medium.

17. The system of claim 13 further comprising a sensing medium disposed within the interior of the second photonic ring resonator and optically coupled to the second photonic ring resonator, wherein the sensing medium is configured to undergo a change in refractive index responsive to one or more analytes bound to the sensing medium.

18. A system comprising:

a first photonic ring resonator having a first outer diameter and a first inner diameter;

a second photonic ring resonator having a second outer diameter and a second inner diameter, the second outer diameter being less than the first inner diameter, the second photonic ring resonator separated from and optically coupled to the first photonic ring resonator and located within the first inner diameter;

a third ring resonator having a third outer diameter and a third inner diameter, the third outer diameter being less than the second inner diameter, the third photonic ring resonator separated from and optically coupled to the first photonic ring resonator and the second photonic ring resonator and located within the second inner diameter, wherein the first photonic ring resonator, the second photonic ring resonator, and the third photonic ring resonator are each concentric and comprise a silicon-based material;

a waveguide structure comprising two parallel bus waveguides optically coupled on opposite ends of the first photonic ring resonator; and a sensing medium disposed within the interior of the third photonic ring resonator and optically coupled to the third photonic ring resonator, wherein the sensing medium is configured to undergo a change in refractive index responsive to one or more analytes bound to the sensing medium.

* * * * *